US010368131B2

(12) United States Patent
Kim

(10) Patent No.: US 10,368,131 B2
(45) Date of Patent: Jul. 30, 2019

(54) METHODS AND APPARATUS FOR PROVIDING AUDIO-VIDEO CONTENT RECOMMENDATIONS BASED ON PROMOTION FREQUENCY

(71) Applicant: Sling Media Inc., Foster City, CA (US)

(72) Inventor: James Kim, Redwood City, CA (US)

(73) Assignee: SLING MEDIA LLC, Foster City, CA (US)

( * ) Notice: Subject to any disclaimer, the term of this patent is extended or adjusted under 35 U.S.C. 154(b) by 0 days.

(21) Appl. No.: 15/233,752

(22) Filed: Aug. 10, 2016

(65) Prior Publication Data

US 2018/0048939 A1 Feb. 15, 2018

(51) Int. Cl.
*H04N 21/466* (2011.01)
*H04N 21/442* (2011.01)
*H04N 21/81* (2011.01)
*H04N 21/482* (2011.01)

(52) U.S. Cl.
CPC ... *H04N 21/4668* (2013.01); *H04N 21/44222* (2013.01); *H04N 21/4667* (2013.01); *H04N 21/4826* (2013.01); *H04N 21/812* (2013.01)

(58) Field of Classification Search
CPC .............. H04N 21/4668; H04N 21/24; H04N 21/44222; H04N 21/4826; H04N 21/812; H04N 21/81
See application file for complete search history.

(56) References Cited

U.S. PATENT DOCUMENTS

| | | | | |
|---|---|---|---|---|
| 2008/0263583 A1* | 10/2008 | Heath | ................... | G06Q 30/02 725/32 |
| 2009/0158307 A1* | 6/2009 | Kashitani | ............... | H04H 60/37 725/9 |
| 2010/0146533 A1* | 6/2010 | Matsunaga | ............ | G06Q 30/02 725/22 |
| 2010/0262486 A1* | 10/2010 | Matsunaga | ............ | G06Q 30/02 705/14.43 |
| 2011/0247036 A1* | 10/2011 | Adimatyam | ....... | H04N 5/44543 725/40 |
| 2012/0158461 A1* | 6/2012 | Aldrey | ............... | G06Q 30/0201 705/7.35 |
| 2016/0066039 A1* | 3/2016 | Bhamidipati | ..... | G06F 17/30029 725/14 |

\* cited by examiner

*Primary Examiner* — Benjamin R Bruckart
*Assistant Examiner* — Susan X Li
(74) *Attorney, Agent, or Firm* — Lorenz & Kopf LLP

(57) ABSTRACT

A method for providing recommendations for audio/video content is provided. The method obtains, by a computing device, a plurality of promotion frequencies, each of the plurality of promotion frequencies being associated with presentation of promotional advertisements for a respective set of audio/video content; identifies, by the computing device, a subset of the plurality of promotion frequencies indicative of highly-promoted sets of audio/video content; compares, by the computing device, the subset to viewing habits of a user to identify corresponding data; and determines, by the computing device, recommendations for potential viewing by the user, based on the corresponding data.

14 Claims, 7 Drawing Sheets

METHODS AND APPARATUS FOR PROVIDING AUDIO-VIDEO CONTENT RECOMMENDATIONS BASED ON PROMOTION FREQUENCY

TECHNICAL FIELD

Embodiments of the subject matter described herein relate generally to providing audio/video content, and more particularly, embodiments of the subject matter relate to providing intelligent recommendations for audio/video content.

BACKGROUND

With the advent of digital streaming technologies, as well as the development of ever-advanced network communications and data processing devices, television viewers are no longer content to simply channel-surf or browse on-demand content providers and hope to find a suitable and enjoyable movies or television shows. To the contrary, many viewers prefer to obtain audio/video content recommendations from various sources, including other people (e.g., friends, neighbors, coworkers) and television service providers (e.g., cable, satellite, set-top box (STB) providers), and to try out new shows and movies that have been recommended to them.

Television service providers generally provide recommendations by identifying content that similar people with similar tastes are selecting to watch. These recommendations are based on trends and historical viewing data, which is not available for new shows that have not previously been aired or made available via on-demand services. Thus, a user may not be aware of a new show, and the user will not receive a recommendation for the new show because it is not associated with historical viewing data.

Accordingly, it is desirable to provide recommendations based on other factors and/or variables, other than the viewing habits of other users. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing recommendations for audio/video content. The method obtains, by a computing device, a plurality of promotion frequencies, each of the plurality of promotion frequencies being associated with presentation of promotional advertisements for a respective set of audio/video content; identifies, by the computing device, a subset of the plurality of promotion frequencies indicative of highly-promoted sets of audio/video content; compares, by the computing device, the subset to viewing habits of a user to identify corresponding data; and determines, by the computing device, recommendations for potential viewing by the user, based on the corresponding data.

Some embodiments provide a computing device. The computing device includes: a system memory element, configured to store viewing habit data associated with a user; a display device, configured to present recommendations for audio/video content for the user; and at least one processor, communicatively coupled to the system memory element, and the display device, the at least one processor configured to: determine a plurality of promotion frequencies, each of the promotion frequencies being associated with presentation of promotional advertisements for a respective set of audio/video content; identify a subset of the promotion frequencies indicative of highly-promoted sets of audio/video content; compare the subset to viewing habits of a user to identify corresponding data; determine the recommendations for potential viewing by the user, based on the corresponding data; and initiate presentation of the recommendations, via the display device.

Some embodiments provide a method for identifying television programming suggestions appropriate to a user. The method identifies television programs associated with a high level of promotional advertisements, by a set-top box (STB) communicatively coupled to a display device; determines, by the STB, that one or more of the television programs corresponds to television content previously viewed by the user; and presents recommendations for the one or more of the television programs via the display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
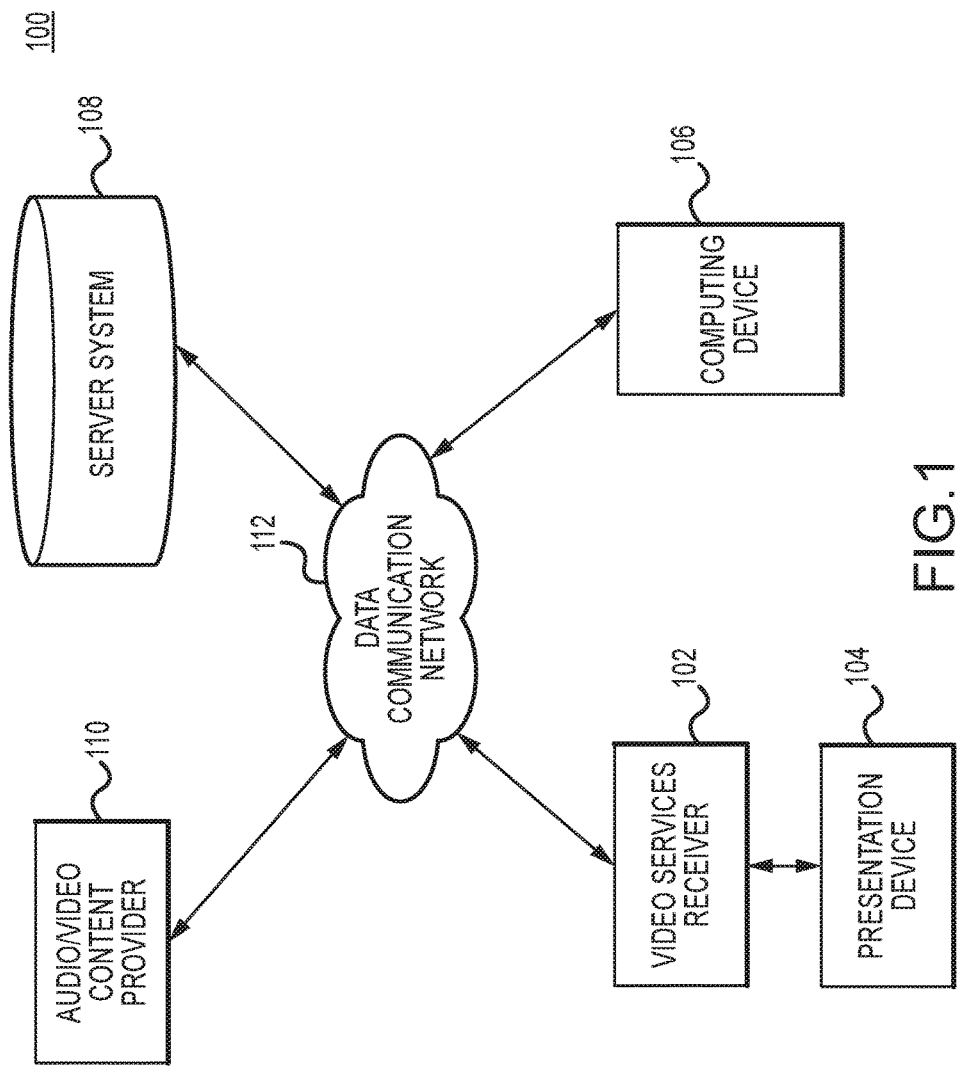
FIG. 1 is a diagram of a recommendation analysis system, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure relates to methods and apparatus for presenting audio/video content recommendations for a user, based on audio/video content that has been promoted or advertised at an increased rate, and which corresponds to the viewing habits of the user.

Certain terminologies are used with regard to the various embodiments of the present disclosure. Audio/video content may be any live broadcast television programming, on-demand programming, and/or recorded programming Audio/video content may be presented over the air (e.g., via a broadcast television network), over the internet (e.g., online), via cable or satellite television provider, or may be retrieved from a recording device (e.g., DVR/PVR). Audio/video content may include, without limitation, television shows, movies, sports presentations, award shows, musical presentations, or any other type of programming presented for viewing by a user.

Recommendations for audio/video content may be any presented list, menu, or user-selectable link detailing sets of audio/video content determined to be of likely interest to a user, based on the user's viewing history (i.e., the sets of audio/video content that the user has selected and viewed previously).

Promotional advertisements, promotions, or "promos" include data publicizing a particular set of audio/video content for purposes of encouraging users to view the promoted content. For example, when a particular broadcast network produces a new television show, the network will publicize the show using television commercials (i.e., promotional advertisements, promotions, promos).

A promotion frequency is a rate of how often promotional advertisements are presented for a particular set of audio/video content, over a particular period of time. Promotion frequencies may be obtained for any number of television programs (i.e., sets of audio/video content), and compared to determine promotion frequencies that are "high" or in other words, greater than a typical promotion frequency or a "low" promotion frequency. High promotion frequencies are associated with highly-promoted television programs, and low promotion frequencies are associated with television programs that are not promoted often.

Automatic content recognition technology is used to identify audio/video content, which may include television programming and advertisements/commercial content. Automatic content recognition techniques may use "fingerprinting" or other methods of identifying audio/video content. Automatic content recognition data may be filtered to identify promotional advertisements and analyzed to determine promotion frequencies associated with each type of promotional advertisement.

Metadata associated with audio/video content may include electronic program guide data, synopsis data, identifying information (e.g., season identifier, episode number, episode title, names of people appearing in the set of audio/video content). Some or all of the metadata may be obtained from automatic content recognition data and, in this case, the metadata acquired from automatic content recognition data may be verified by comparison with other sources of metadata. Knowledge of (i) a particular broadcast network associated with the audio/video content, and (ii) a day and/or time the audio/video content is presented, permits the system to identify the set of audio/video content and to derive other data (e.g., metadata) from such metadata sources.

Turning now to the figures, FIG. 1 is a diagram of a recommendation analysis system 100, in accordance with the disclosed embodiments. As shown, the video services receiver 102 is used cooperatively with a presentation device 104 to provide a user with a display of audio/video content. The audio/video content is communicated from an audio/video content provider 110 to a plurality of video services receivers 102 and/or a plurality of computing devices 106 via the data communication network 112, fiber, internet, wireless, or cellular networks, and/or off-air, satellite, or cable broadcasts. In various embodiments, each video services receiver 102 is a conventional set-top box commonly used with satellite or cable television distribution systems. In other embodiments, however, the functionality of a video services receiver 102 may be commonly housed within a presentation device 104. In still other embodiments, a video services receiver 102 is a portable device that may be transportable with or without the presentation device 104. A video services receiver 102 may also be suitably configured to support broadcast television reception, video game playing, personal video recording and/or other features as desired. The video services receiver 102 may be configured to record received video broadcast content, and may comprise Digital Video Recorder (DVR) technology.

Each video services receiver 102 may include or cooperate with a suitably configured presentation device 104, and each video services receiver 102 produces output that is communicated to the presentation device 104. The presentation device 104 may be implemented as, without limitation: a television set; a monitor; a computer display; a portable electronic device; or any suitable customer appliance with compatible display capabilities.

During typical operation, the video services receiver 102 receives audio/video content, signaling information, and/or other data via the data communication network 112, fiber, internet, wireless, or cellular networks, and/or off-air, satellite, or cable broadcasts. The video services receiver 102 then demodulates, descrambles, decompresses, and/or otherwise processes the received digital data, and then converts the received data to suitably formatted video signals that can be rendered for viewing, and/or stored for future viewing, by the customer on the presentation device 104. The video services receiver 102 is further configured to receive data associated with audio/video content provided by the audio/video content provider 110, and to generate and maintain viewing recommendations specific to a user or group of users. The data associated with the audio/video content and generated user viewing recommendations may be transmitted by the video services receiver 102 to the presentation device 104 for display.

In certain embodiments, a computing device 106 may be employed by a user to replace the video services receiver 102 and to perform the functionality of the video services receiver 102, including receiving audio/video content from the audio/video content provider 110, displaying the audio/video content (with an integrated or communicatively-coupled display device), displaying electronic program guide data and recommendations for user viewing, or the like. In some embodiments, the computing device 106 may store and execute one or more software applications (i.e., "apps") configured to perform functions and provide features of the video services receiver 102, as described herein.

The video services receiver 102 and the computing device 106 are capable of communicating with a server system 108 via a data communication network 112. The video services receiver 102 (or the computing device 106) and the server system 108 are generally disparately located. The data communication network 112 may be any digital or other communications network capable of transmitting messages or data between devices, systems, or components. In certain embodiments, the data communication network 112 includes a packet switched network that facilitates packet-based data communication, addressing, and data routing. The packet switched network could be, for example, a wide area network, the Internet, or the like. In various embodiments, the data communication network 112 includes any number of public or private data connections, links or network connections supporting any number of communications protocols. The data communication network 112 may include the Internet, for example, or any other network based upon TCP/IP or other conventional protocols. In various embodiments, the data communication network 112 could also incorporate a wireless and/or wired telephone network, such as a cellular communications network for communicating with mobile phones, personal digital assistants, and/or the like. The data communication network 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The video services receiver 102 and/or the computing device 106 communicate, via the data communication network 112, with the server system 108 to receive data associated with audio/video content. The video services receiver 102 is configured to transmit, to the server system 108, requests for data associated with audio/video content. The server system 108 stores data associated with sets of audio/video content, and provides (i.e., transmits) this data in response to requests from the video services receiver 102 and/or the computing device 106. The present disclosure uses the term "server system" for simplicity. However, the server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations.

During typical operation, the video services receiver 102 (or the computing device 106) receives audio/video content from the audio/video content provider 110 and presents the audio/video content to a user via the presentation device 104. The video services receiver 102 receives automatic content recognition data and user viewing history from the server system 108. The video services receiver 102 then uses the automatic content recognition data to identify the most frequently promoted television programs, and correlates these highly-promoted television programs to the user viewing history to identify potential viewing options (i.e., potential television programs) that may be interesting to the user, and which the user may wish to view in the future. The video services receiver 102 presents these potential viewing options as recommendations to the user, via the presentation device 104.

Figure 2:
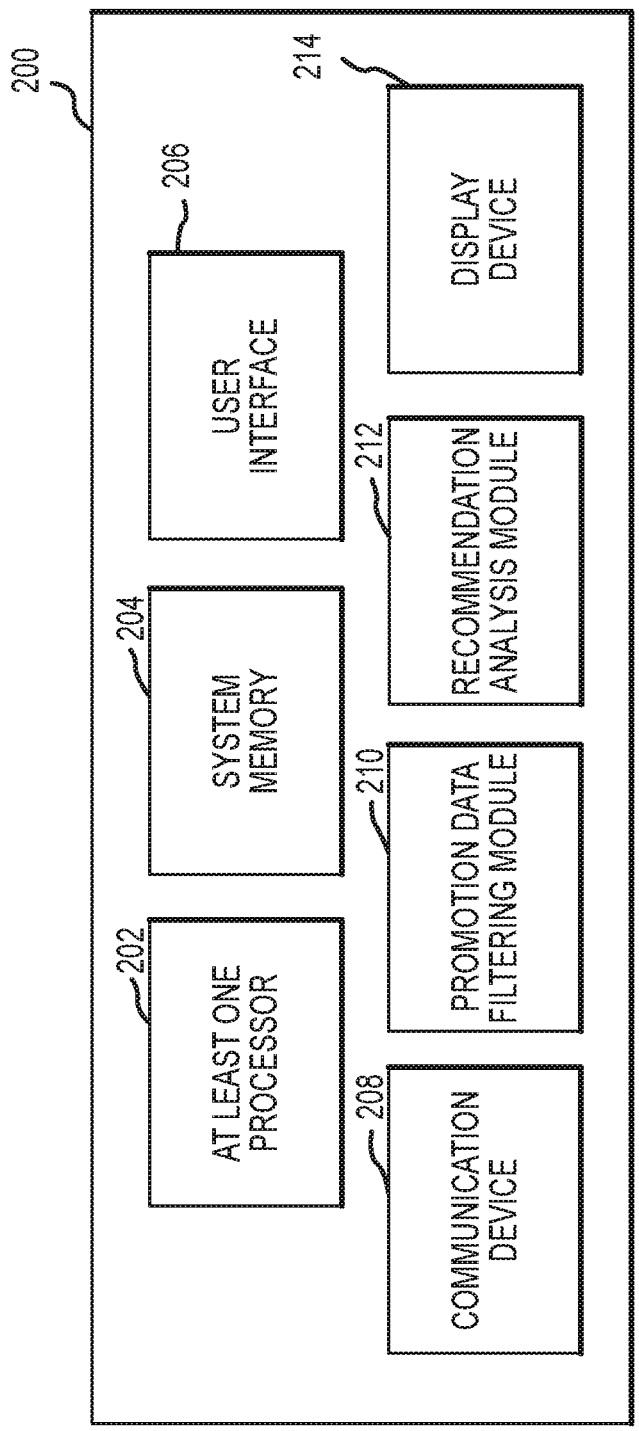
FIG. 2 is a functional block diagram of a computing device for use in a recommendation analysis system, in accordance with the disclosed embodiments.

FIG. 2 is a functional block diagram of a computing device 200 for use in a recommendation analysis system, in accordance with the disclosed embodiments. It should be noted that the computing device 200 can be implemented as the video services receiver 102 and/or the computing device 106 depicted in FIG. 1. In this regard, the computing device 200 shows certain elements and components of the video services receiver 102 and/or the computing device 106 in more detail.

The computing device 200 generally includes, without limitation: at least one processor 202; a system memory element 204; a user interface 206; a communication device 208; a promotion data filtering module 210; a recommendation analysis module 212; and a display device 214. These elements and features of the computing device 200 may be operatively associated with one another, coupled to one another, or otherwise configured to cooperate with one another as needed to support the desired functionality—in particular, providing recommendations for audio/video content, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the audio/video content recommendation techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store audio/video content metadata, electronic program guide data, automatic content recognition data, promotion frequencies, or any other data applicable to operations of the computing device 200. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, a remote control, or any device, component, or function that enables the user to select options, input information, or otherwise control the operation of the computing device 200. For example, the user interface 206 could be manipulated by an operator to select a set of audio/video content for viewing, select and view electronic program guide data, select and view user viewing recommendations, or the like.

In certain embodiments, the user interface 206 may include or cooperate with various features to allow a user to interact with the computing device 200 via graphical elements rendered on a display device 214. Accordingly, the user interface 206 may initiate the creation, maintenance, and presentation of a graphical user interface (GUI). In certain embodiments, the display device 214 implements touch-sensitive technology for purposes of interacting with the GUI. Thus, a user can manipulate the GUI by moving a cursor symbol rendered on the display device 214, or by physically interacting with the display device 214 itself for recognition and interpretation, via the user interface 206. In some embodiments, the user interface 206 may cooperate with a particular software application (e.g., an "app") implemented on a smart device or computer to provide display data to a graphical user interface (GUI) in the app. In embodiments using an app, the user interface 206 and the display device 214 are configured to cooperatively display audio/video content via the GUI, in addition to graphical elements suitable for changing channels, controlling personal video recorder (PVR), digital video recorder (DVR), and/or remote storage DVR (RSDVR) recordings, viewing electronic program guide data and user viewing recommendations, and/or other control functionality associated with video content control and playback.

The communication device 208 is suitably configured to transmit signals from the computing device 200, to receive data transmissions from at least a remote server system (see reference 108, FIG. 1), and to perform processing on the data received by the computing device 200. As described in more detail herein, data received by the communication device 208 may include, without limitation: audio/video content and data associated with the audio/video content (e.g., audio/video content metadata, automatic content recognition data, promotion frequencies); and the like. Data provided by the communication device 208 may include, without limitation: calculated promotion frequencies, determined recommendations for user viewing, requests for automatic content recognition data and/or promotion frequency data; and the like. The communication device 208 is compatible with communication protocol described previously (see reference 112, FIG. 1), and may leverage conventional design concepts that need not be described in detail here.

The promotion data filtering module 210 is configured to receive, via the communication device 208, automatic content recognition data, and to filter the automatic content recognition data to recognize the highest frequencies of promotional advertisements for particular programming (e.g., television shows, movies). From the highest frequencies that are recognized, the promotion data filtering module 210 is configured to identify the most highly-promoted television programs, which may be presented to a user as recommended for viewing.

The recommendation analysis module 212 is configured to compare the most frequently promoted (i.e., the most highly-promoted) television programs to the viewing history of a user to identify highly-promoted television programming that is relevant to a particular user, and that the user is likely to wish to view. The recommendation analysis module 212 thus identifies and provides "smart" audio/video content recommendations for that particular user. In certain embodiments, the computing device 200 is used by one particular user, and the viewing habits and/or recommendations are specific to that user. In some embodiments, however, the computing device 200 may be used by a plurality of users. For example, a set-top box (STB) associated with cable, satellite, or internet-provided, online television programming may be set up in a home and used by a family or other group of people residing in the home. In this example, the viewing habits and/or recommendations are specific to that particular group of people.

In practice, the promotion data filtering module 210 and/or the recommendation analysis module 212 may be implemented with (or cooperate with) the at least one processor 202 to perform at least some of the functions and operations described in more detail herein. In this regard, the promotion data filtering module 210 and/or the recommendation analysis module 212 may be realized as suitably written processing logic, application program code, or the like.

The display device 214 is configured to display various icons, text, and/or graphical elements associated with audio/video content, electronic program guide data, data associated with the audio/video content, recommendations of audio/video content for a particular user or group of users, or the like. In an exemplary embodiment, the display device 214 is communicatively coupled to the user interface 206. The user interface 206 is communicatively coupled to the at least one processor 202, and the at least one processor 202 and the user interface 206 are cooperatively configured to display, render, or otherwise convey one or more graphical representations or images associated with audio/video content and audio/video content recommendations on the display device 214, as described in greater detail herein.

In some embodiments, the display device 214 may be integrated into the computing device 200 (e.g., wherein the display device 214 and the computing device 200 share a common housing), or the display device 214 may be implemented as a separate display element that is communicatively coupled to the computing device 200. In certain embodiments, the display device 214 may be cooperatively implemented with the user interface 206. For example, functionality of the display device 214 and the user interface 206 may be provided by a touchscreen interface. In other embodiments, the display device 214 may be implemented as a display element that provides only display functionality and the user interface 206 may be separately implemented and configured to provide only user interface functionality. It will be appreciated that although the display device 214 may be implemented using a single display device 214, certain embodiments may use additional display devices to accomplish the functionality of the display device 214 described herein.

Figure 3:
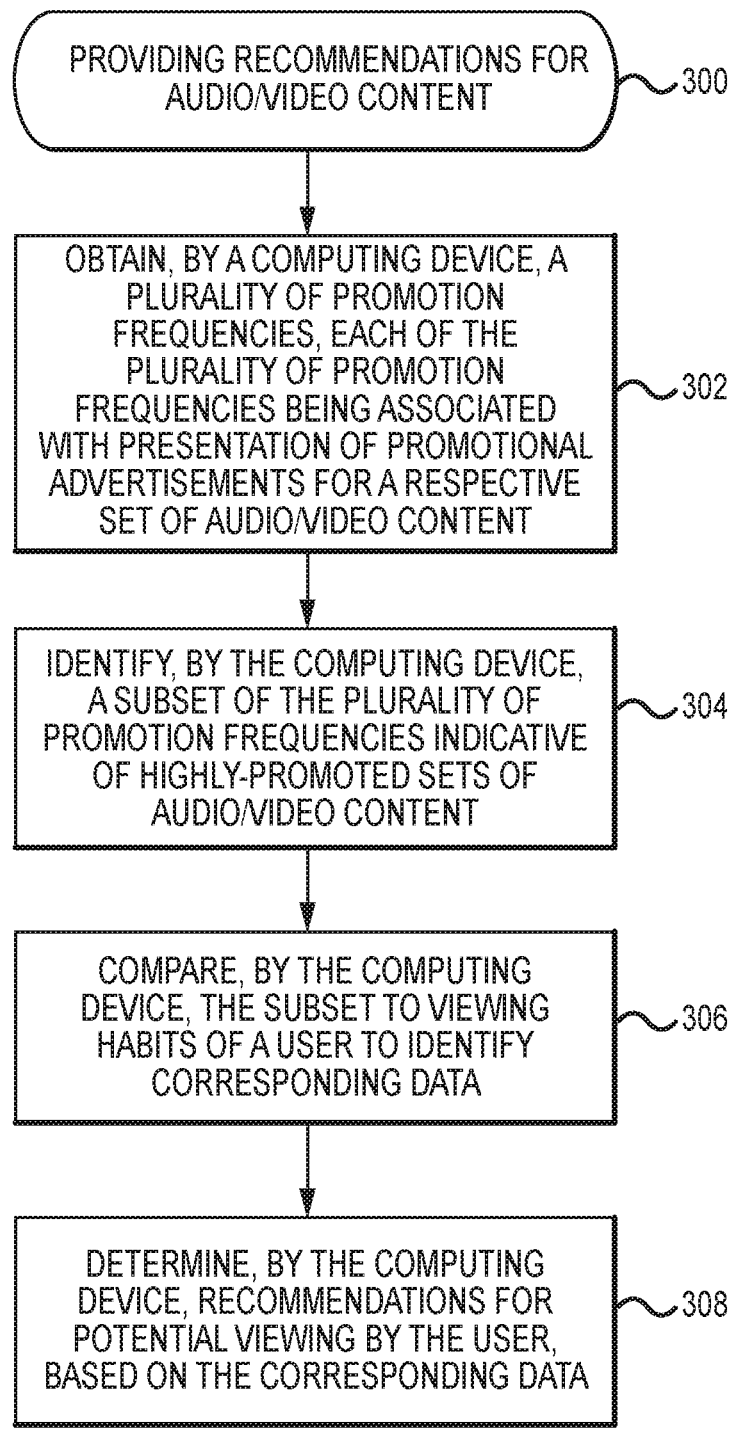
FIG. 3 is a flow chart that illustrates an embodiment of a process for providing recommendations for audio/video content.

FIG. 3 is a flow chart that illustrates an embodiment of a process 300 for providing recommendations for audio/video content, for a particular user or group of users. First, the process 300 obtains, by a computing device, a plurality of promotion frequencies, each of the plurality of promotion frequencies being associated with presentation of promotional advertisements for a respective set of audio/video content (step 302). One suitable methodology for obtaining a plurality of promotion frequencies is described below with reference to FIG. 4, and is associated with automatic content recognition data. In other embodiments, the process 300 may obtain the plurality of promotion frequencies by: (1) evaluating a website of a broadcast network to identify the presentation of promotional advertisements of a particular television program, and (2) determining how often the promotional advertisements for the particular television program are presented via the website, for a defined period of time.

Next, the process 300 identifies, by the computing device, a subset of the plurality of promotion frequencies indicative of highly-promoted sets of audio/video content (step 304). One suitable methodology for identifying a subset of the plurality of promotion frequencies indicative of highly-promoted sets of audio/video content is described below with reference to FIG. 5. High promotion frequencies indicate a high rate of presenting promotional advertisements for particular television programs. In some exemplary embodiments, the process 300 identifies a particular number of the most frequently promoted sets of audio/video content. For example, the process 300 may select the top three most frequently promoted sets of audio/video content. In other examples, the process 300 may select the top five, the top ten, or other number of the most frequently promoted sets of audio/video content.

The process 300 then compares, by the computing device, the subset to viewing habits of a user to identify corresponding data (step 306). Suitable methodologies for comparing the subset to viewing habits of a user to identify corresponding data are described below with reference to FIGS. 6-7. Next, the process 300 determines, by the computing device, recommendations for potential viewing by the user, based on the corresponding data (step 308). The viewing habits or viewing history of the user includes particular sets of audio/video content (e.g., television programs, movies, sports programs) that the user has viewed previously. When these previously-viewed television programs include characteristics that are common to a highly-promoted television program, then the process 300 uses the common characteristics to determine recommendations of other television programming that the user may wish to view.

Figure 4:
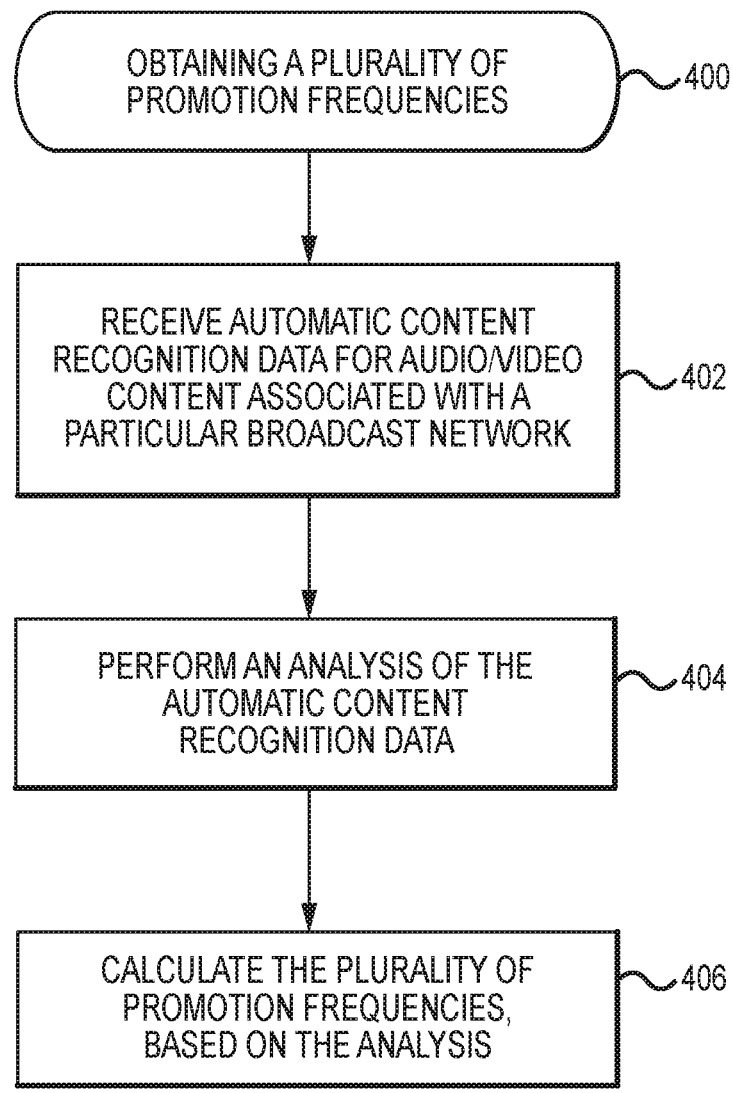
FIG. 4 is a flow chart that illustrates an embodiment of a process for obtaining a plurality of promotion frequencies.

FIG. 4 is a flow chart that illustrates an embodiment of a process 400 for obtaining a plurality of promotion frequencies. It should be appreciated that the process 400 described in FIG. 4 represents one embodiment of step 302 described above in the discussion of FIG. 3, including additional detail. First, the process 400 receives automatic content recognition data for audio/video content associated with a particular broadcast network (step 402). The automatic content recognition data received by the process 400 includes identified television programming and identified promotional advertisements. Automatic content recognition technology is used to identify audio/video content, which may include television programming and advertisements/commercial content. Automatic content recognition techniques may use "fingerprinting" or other methods of identifying audio/video content. Automatic content recognition data may be filtered to identify promotional advertisements and analyzed to determine promotion frequencies associated with each type of promotional advertisement.

The automatic content recognition data is associated with a defined period of time, and thus identifies promotional advertisements presented during the defined period of time. In some embodiments, the automatic content recognition data is also associated with a particular broadcast network. For example, the process 400 identifies promotional advertisements presented by the particular broadcast network during the defined period of time. In some embodiments, the process 400 acquires the automatic content recognition data from an outside source. For example, the process 400 may receive a set of transmitted data for which a set of audio/video content has been identified. In some embodiments, the process 400 generates the automatic content recognition data using audio or video fingerprinting techniques, or other audio/video content recognition techniques.

Next, the process 400 performs an analysis of the automatic content recognition data (step 404). The process 400 identifies each of the promotional advertisements included in the automatic content recognition data. For example, the automatic content recognition data received by the process 400 may include promotional advertisements for Program X, Program Y, and Program Z. Here, the process 400 identifies each of the promotional advertisements associated with each of Program X, Program Y, and Program Z.

Figure 5:
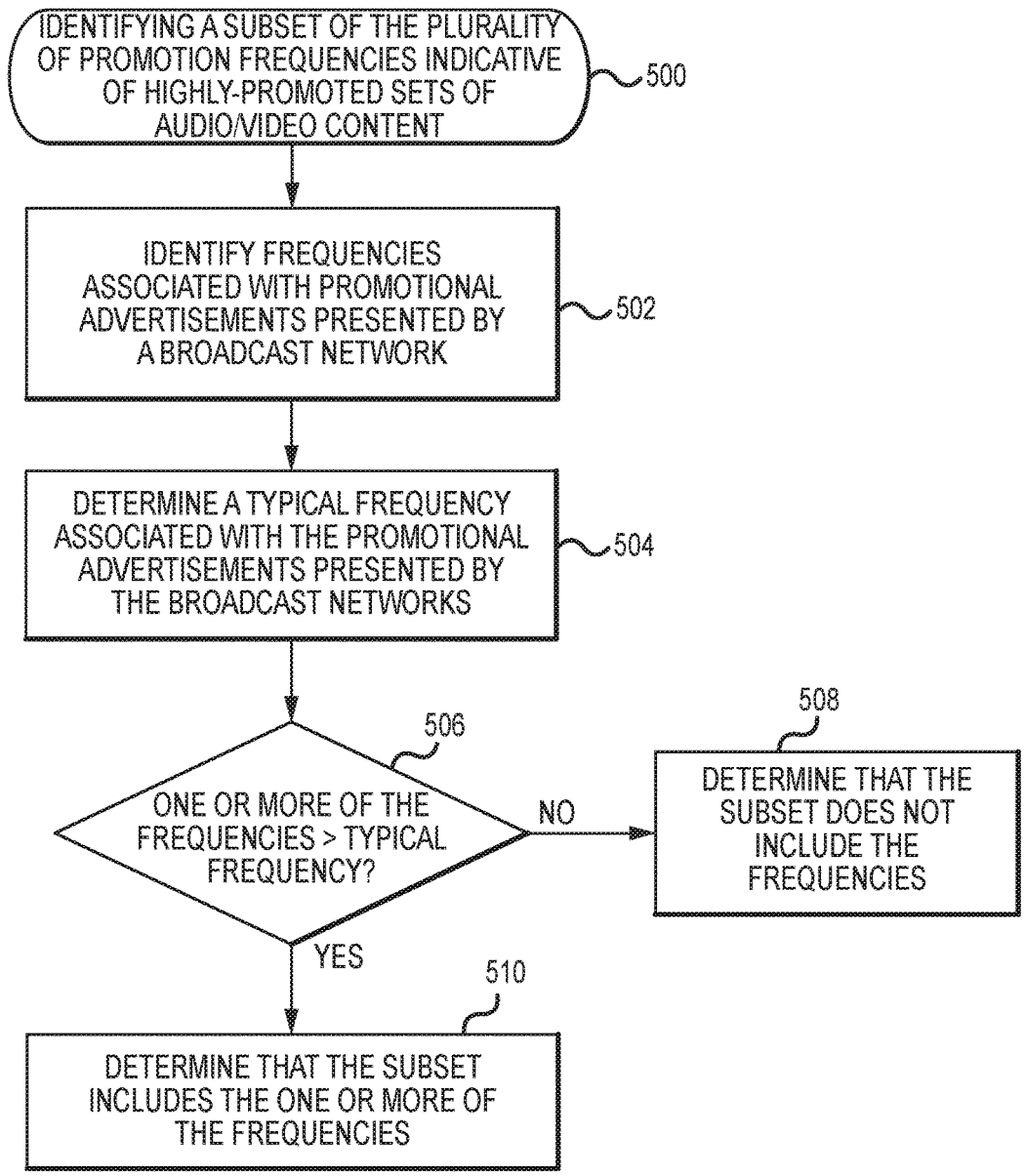
FIG. 5 is a flow chart that illustrates an embodiment of a process for identifying a subset of the plurality of promotion frequencies indicative of highly-promoted sets of audio/video content.

The process 400 then calculates the plurality of promotion frequencies, based on the analysis (step 406). A promotion frequency is a rate of how often promotional advertisements are presented for a particular set of audio/video content, over a particular period of time. Promotion frequencies may be obtained for any number of television programs (e.g., Program X, Program Y, Program Z) for which promotional advertisements are presented during the defined period of time. In this particular example, the process 400 determines the rate at which each of Program X, Program Y, and Program Z is promoted during the defined period of time FIG. 5 is a flow chart that illustrates an embodiment of a process 500 for identifying a subset of the plurality of promotion frequencies indicative of highly-promoted sets of audio/video content. It should be appreciated that the process 500 described in FIG. 5 represents one embodiment of step 304 described above in the discussion of FIG. 3, including additional detail. First, the process 500 identifies frequencies associated with promotional advertisements presented by a particular broadcast network (step 502).

Next, the process 500 determines a typical frequency associated with the promotional advertisements presented by the broadcast network (step 504). In some embodiments, the typical frequency may be an average frequency for presenting promotional advertisements for the broadcast network. In other embodiments, the typical frequency may be a minimum frequency for presenting promotional advertisements for the broadcast network. The process 500 generally determines the typical frequency by adding all of the promotions that are run on the particular broadcast network, and then separates the added promotion numbers into groups by program (i.e., set of audio/video content). The typical frequency will be the average number of times any one of those programs is promoted in a particular time period (e.g., one day, one week, one month). If a popular program is promoted ninety times in one day (i.e., a 24-hour period), and the average number of times a program is promoted is sixteen times in one day, then the process 500 determines that the popular program is associated with a promotion frequency that is higher than the typical frequency.

The process 500 then determines whether one of the frequencies is greater than the typical frequency (decision 506). Here, the process 500 uses the identified typical frequency as a threshold, and when one of the frequencies is not greater than the typical frequency (i.e., when a particular television program is not promoted with greater frequency than the typical frequency) (the "No" branch of 506), then the process 500 determines that the subset does not include the one of the frequencies (step 508). In other words, the process 500 determines that the one of the frequencies is not indicative of a highly-promoted television program. However, when a particular television program is promoted with greater frequency than the typical frequency (i.e., the one of the frequencies is greater than the typical frequency) (the "Yes" branch of 506), then the process 500 determines that the subset includes the one of the frequencies (step 510). In other words, the process 500 determines that the one of the frequencies is indicative of a highly-promoted television program.

Figure 6:
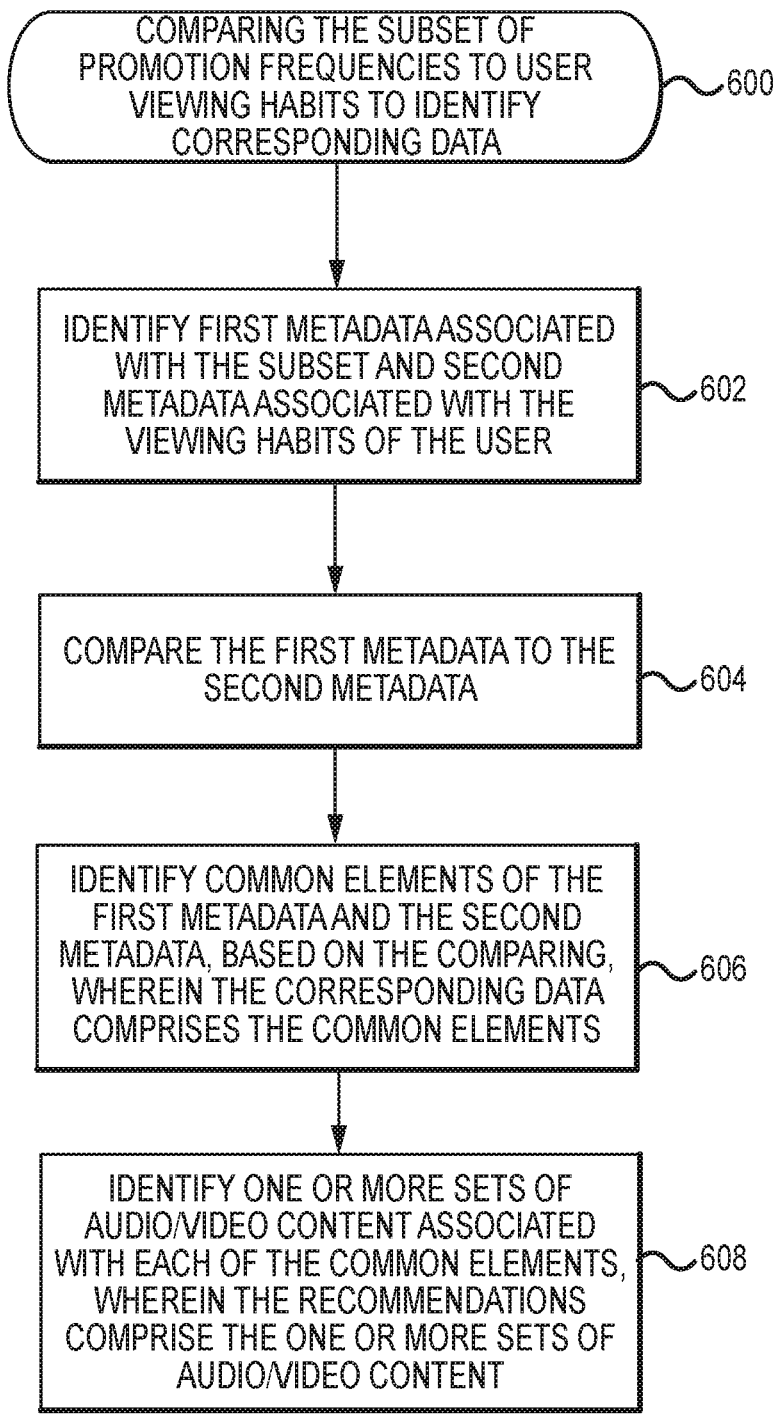
FIG. 6 is a flow chart that illustrates an embodiment of a process for comparing the subset of promotion frequencies to user viewing habits to identify corresponding data.

FIG. 6 is a flow chart that illustrates an embodiment of a process 600 for comparing the subset of promotion frequencies to user viewing habits to identify corresponding data. It should be appreciated that the process 600 described in FIG. 6 represents one embodiment of step 306 described above in the discussion of FIG. 3, including additional detail.

The process 600 identifies first metadata associated with the subset of promotion frequencies, and second metadata associated with the viewing habits of the user (step 602). The subset of promotion frequencies is indicative of highly-promoted sets of audio/video content (i.e., television programs). The metadata associated with the subset of promotion frequencies is thus associated with highly-promoted television programs. Metadata may include, without limitation: electronic program guide data; synopsis data; identifying information (e.g., season identifier, episode number, episode title, names of people appearing in the set of audio/video content); directors, writers, producers, and studio that produced the program; syndication status; genre; mood; actor demographics (e.g., age, gender, race, citizenship); dayparts (e.g., primetime, daytime, late night).

Each of the subset of promotion frequencies is a promotion frequency that indicates a highly-promoted television program (see FIG. 5). For example, Promotion Frequency 1 may be associated with Program X. If Promotion Frequency 1 is included in the subset of promotion frequencies, then Program X is identified as a highly-promoted television program. In other words, the promotional advertisements for Program X are presented at a high rate for a defined period of time. Viewing habits of the user include a history of television programming that the user has selected and viewed. The process 600 may retrieve the viewing habit data from local storage of a computing device or set-top box (STB), or receive viewing habit data as a data transmission from remote storage of any type, as described in FIGS. 1-2.

The process 600 then compares the first metadata to the second metadata (step 604), and identifies common elements of the first metadata and the second metadata, based on the comparing, wherein the corresponding data comprises the common elements (step 606). The process 600 may identify a common television program identifier, a common category of television program, a common actor, or other common criteria that correlates a highly-promoted television show to the viewing history or viewing habits of the user.

Next, the process 600 identifies one or more sets of audio/video content (i.e., one or more television programs) associated with each of the common elements, wherein the recommendations comprise the one or more sets of audio/video content (step 608). Here, the process 600 uses the common elements of the sets of metadata to identify one or more television programs which may interest the user, and which may be presented as recommendations to the user.

Figure 7:
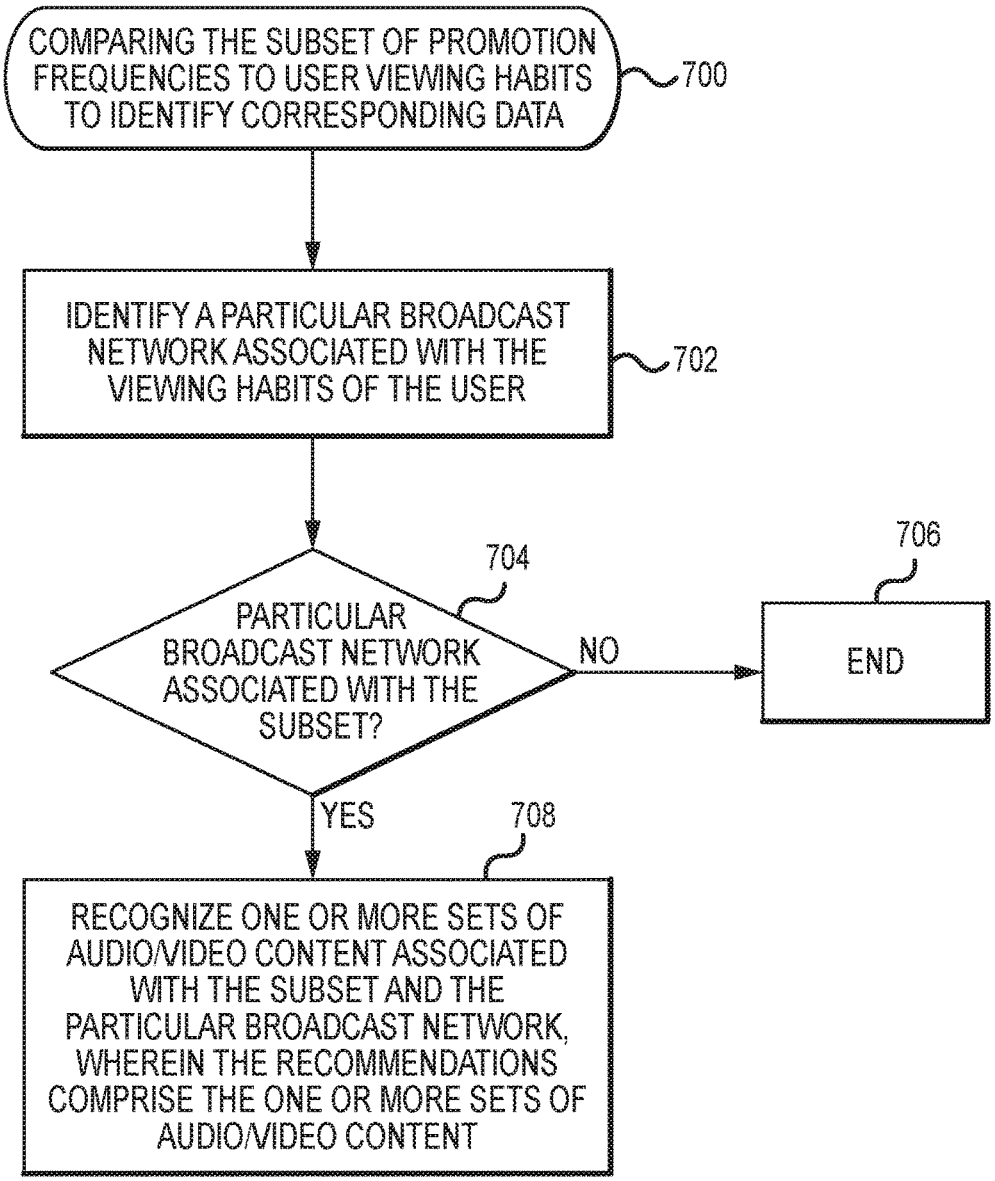
FIG. 7 is a flow chart that illustrates an embodiment of a process for comparing the subset of frequencies to user viewing habits to identify corresponding data.

FIG. 7 is a flow chart that illustrates an embodiment of a process 700 for comparing the subset of frequencies to user viewing habits to identify corresponding data. It should be appreciated that the process 700 described in FIG. 7 represents another embodiment of step 306 described above in the discussion of FIG. 3, including additional detail. First, the process 700 identifies a particular broadcast network associated with the viewing habits of the user (step 702). Audio/video content viewed by a user may be presented by a particular broadcast network. Here, the process 700 evaluates the user's viewing history and identifies a broadcast network that presented particular television programs that have been viewed by the user.

Next, the process 700 determines whether the particular broadcast network is associated with the subset of promotion frequencies indicative of highly-promoted sets of audio/video/content (decision 704).

When the particular broadcast network is not associated with the subset (the "No" branch of 704), then the process 700 ends (step 706). However, when the particular broadcast network is associated with the subset (the "Yes" branch of 704), then the process 700 recognizes one or more sets of audio/video content associated with the subset and the particular broadcast network (step 708), wherein the recommendations comprise the one or more sets of audio/video content.

Here, when the process 700 determines that the user has viewed programming presented by a particular broadcast network in the past, and that other television programming presented by the broadcast network is highly-promoted or very frequently promoted. Based on this correlation, the process 700 recognizes the highly-promoted television programming as a relevant recommendation for potential viewing by the user. Essentially, the process 700 provides a recommendation to the user to view new and highly-promoted programming, since the user has previously viewed programming presented by the broadcast network in the past.

The various tasks performed in connection with processes 300-700 may be performed by software, hardware, firmware, or any combination thereof. For illustrative purposes, the preceding description of processes 300-700 may refer to elements mentioned above in connection with FIGS. 3-7. In practice, portions of processes 300-700 may be performed by different elements of the described system. It should be appreciated that processes 300-700 may include any number of additional or alternative tasks, the tasks shown in FIGS. 3-7 need not be performed in the illustrated order, and processes 300-700 may be incorporated into a more comprehensive procedure or process having additional functionality not described in detail herein. Moreover, one or more of the tasks shown in FIGS. 3-7 could be omitted from embodiments of the processes 300-700 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing recommendations for audio/video content, the method comprising:
   identifying highly-promoted sets of audio/video content, by:
      obtaining, by a computing device, a plurality of promotion frequencies, each of the plurality of promotion frequencies comprising a rate of presentation of promotional advertisements for one respective television program via one respective television broadcast network;
      identifying, by the computing device, a subset of the plurality of promotion frequencies indicative of the highly-promoted sets of audio/video content, by:
         determining a typical frequency associated with the promotional advertisements presented by the broadcast network;
         comparing the frequencies to the typical frequency; and
         when a first one of the frequencies is greater than the typical frequency, determining that the first one of the frequencies indicates a highly-promoted set of audio/video content comprising a television program, wherein the subset includes the first one;
   identifying potential highly-promoted viewing options of interest to a user, by:
      comparing, by the computing device, the subset to viewing habits of a user to identify corresponding data between the television program and the viewing habits;
      determining, by the computing device, recommendations for potential viewing by the user, based on the corresponding data, wherein the recommendations indicate the highly-promoted set of audio/video content comprising the television program; and presenting the potential highly-promoted viewing options of interest to the user, by:
      displaying the recommendations for potential viewing, via a display device communicatively coupled to the computing device.

2. The method of claim 1, wherein obtaining the plurality of promotion frequencies further comprises:
   receiving automatic content recognition data for audio/video content associated with a particular broadcast network;
   performing an analysis of the automatic content recognition data; and
   calculating the plurality of promotion frequencies, based on the analysis.

3. The method of claim 1, further comprising:
   establishing, by the computing device, a communication connection to a remote server configured to store user viewing habit data;
   wherein comparing the subset to the viewing habits of the user further comprises comparing the subset to the user viewing habit data.

4. The method of claim 1, further comprising:
establishing, by the computing device, a communication connection to a display device; and
presenting the recommendations via the display device.

5. The method of claim 1, wherein comparing the subset to the viewing habits of the user further comprises:
identifying first metadata associated with the subset and second metadata associated with the viewing habits;
comparing the first metadata to the second metadata; and
identifying common elements of the first metadata and the second metadata, wherein the corresponding data comprises the common elements.

6. The method of claim 5, wherein determining the recommendations for potential viewing by the user further comprises:
identifying one or more sets of audio/video content associated with each of the common elements, wherein the recommendations comprise the one or more sets of audio/video content.

7. The method of claim 1, wherein comparing the subset to the viewing habits of the user further comprises:
identifying a particular broadcast network associated with the viewing habits of the user;
determining whether the particular broadcast network is associated with the subset; and
when the particular broadcast network is associated with one or more of the subset, recognizing one or more sets of audio/video content associated with the one or more of the subset, wherein the corresponding data comprises the one or more of the subset, and wherein the recommendations comprises the one or more sets of audio/video content.

8. A computing device, comprising:
a system memory element, configured to store viewing habit data associated with a user;
a display device, configured to present recommendations for audio/video content for the user;
at least one processor, communicatively coupled to the system memory element, and the display device, the at least one processor configured to:
identify highly-promoted sets of audio/video content, by:
determining a plurality of promotion frequencies, each of the promotion frequencies comprising a rate of presentation of promotional advertisements for one respective television program via one respective television broadcast network;
identifying a subset of the promotion frequencies indicative of the highly-promoted sets of audio/video content, by:
determining a typical frequency associated with the promotional advertisements presented by the broadcast network;
comparing the frequencies to the typical frequency; and
when a first one of the frequencies is greater than the typical frequency, determining that the first one of the frequencies indicates a highly-promoted set of audio/video content, wherein the subset includes the first one;
identifying potential highly-promoted viewing options of interest to a user, by:
comparing the subset to viewing habits of a user to identify corresponding data between the television program and the viewing habits;
determining the recommendations for potential viewing by the user, based on the corresponding data, wherein the recommendations indicate the highly-promoted set of audio/video content comprising the television program; and
present the potential highly-promoted viewing options of interest to the user, by:
initiating presentation of the recommendations, via the display device.

9. The computing device of claim 8, further comprising a communication device, configured to receive automatic content recognition data from a remote server;
wherein the at least one processor is further configured to:
analyze the automatic content recognition data; and
compute the promotion frequencies, based on analyzing the automatic content recognition data.

10. The computing device of claim 8, wherein the at least one processor is further configured to compare the subset to the viewing habits of the user, by:
identifying first metadata associated with the subset and second metadata associated with the viewing habits;
comparing the first metadata to the second metadata; and
identifying common elements of the first metadata and the second metadata, wherein the corresponding data comprises the common elements.

11. The computing device of claim 10, wherein the at least one processor is further configured to:
identify one or more sets of audio/video content associated with each of the common elements, wherein the recommendations comprise the one or more sets of audio/video content.

12. The computing device of claim 8, wherein the at least one processor is further configured to compare the subset to the viewing habits of the user, by:
identifying a particular broadcast network associated with the viewing habits of the user;
determining whether the particular broadcast network is associated with the subset; and
when the particular broadcast network is associated with one or more of the subset, recognizing one or more sets of audio/video content associated with the one or more of the subset, wherein the corresponding data comprises the one or more of the subset, and wherein the recommendations comprises the one or more sets of audio/video content.

13. A method for identifying television programming suggestions appropriate to a user, the method comprising:
identifying television programs associated with a high rate of promotional advertisements, by a set-top box (STB) communicatively coupled to a display device, by:
obtaining, by the STB, a plurality of promotion frequencies, each of the plurality of promotion frequencies comprising a rate of presentation of promotional advertisements for one respective television program via one respective television broadcast network;
determining a typical frequency associated with the promotional advertisements presented by the broadcast network;
comparing the frequencies to the typical frequency; and
when a first one of the frequencies is greater than the typical frequency, determining that the first one of the frequencies indicates one or more of the television programs being associated with a high rate of promotional advertisements;
identifying potential highly-promoted viewing options of interest to a user, by:

determining, by the STB, that the one or more of the television programs corresponds to television content previously viewed by the user; and presenting the potential highly-promoted viewing options of interest to the user, by:
   presenting recommendations for the one or more of the television programs via the display device.

14. The method of claim 13, wherein determining that one or more of the television programs corresponds to television content previously viewed by the user further comprises:
   comparing, by the STB, first metadata associated with the television programs to second metadata associated with the television content previously viewed by the user;
   recognizing, by the STB, common elements of the first metadata and the second metadata; and
   identifying, by the STB, television content corresponding to the common elements, wherein the one or more of the television programs comprises the television content;
   wherein the recommendations comprise the television content corresponding to the common elements.

* * * * *